United States Patent
Stach

(10) Patent No.: US 6,312,059 B1
(45) Date of Patent: Nov. 6, 2001

(54) VEHICLE WHEEL

(75) Inventor: Jens Stach, Heimsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/536,297

(22) Filed: Mar. 27, 2000

(30) Foreign Application Priority Data

Mar. 27, 1999 (DE) ............................................. 199 14 051

(51) Int. Cl.⁷ ........................................................... B60B 3/10
(52) U.S. Cl. ............................................. 301/64.2; 301/65
(58) Field of Search .............................. 301/58, 62, 63.1, 301/64.1, 64.2, 64.3, 65, 95–99, 105.1; 29/894.32, 894.321, 894.322, 894.323, 894.324; 228/114.5

(56) References Cited

U.S. PATENT DOCUMENTS

| | | | |
|---|---|---|---|
| 5,538,329 | * 7/1996 | Stach | 301/64.1 |
| 5,575,539 | * 11/1996 | Stach | 301/65 |
| 5,641,208 | * 6/1997 | Stach | 301/64.1 |
| 5,647,642 | * 7/1997 | Word | 301/64.1 |
| 5,718,485 | * 2/1998 | Stach | 301/63.1 |
| 6,024,415 | * 2/2000 | Stach | 301/64.2 |
| 6,170,918 | * 1/2001 | Archibald et al. | 301/63.1 |
| 6,231,129 | * 5/2001 | Stach | 301/64.1 |
| 6,234,581 | * 5/2001 | Stach | 301/64.2 |

FOREIGN PATENT DOCUMENTS

| | | |
|---|---|---|
| 41 38 558 C2 | 5/1994 | (DE) . |
| 0 816 125 A3 | 10/1999 | (EP) . |
| WO 97/15462 | 5/1997 | (WO) . |
| WO 97/47482 | 12/1997 | (WO) . |

* cited by examiner

*Primary Examiner*—S. Joseph Morano
*Assistant Examiner*—Long Bao Nguyen
(74) *Attorney, Agent, or Firm*—Crowell & Moring, LLP

(57) ABSTRACT

A vehicle wheel includes a wheel spider and a wheel rim which can be connected together by a weld. For this purpose, mutually corresponding connection surfaces are provided on the wheel spider and on the wheel rim. The connection surfaces have either different inclinations or identical inclinations so that the two wheel parts can be centered with respect to one another for welding.

18 Claims, 2 Drawing Sheets

VEHICLE WHEEL

This application claims the priority of German application 199 14 051.0, filed Mar. 27, 1999, the disclosure of which is expressly incorporated by reference herein.

BACKGROUND AND SUMMARY OF THE INVENTION

The present invention relates to a particular vehicle wheel having a wheel spider including hollow spokes and a wheel rim. The wheel spider, in a connection area of the wheel rim, is connected with the wheel rim by at least one weld. The wheel spider and the wheel rim have inner and outer connection surfaces which are constructed as two circular rings and which are situated correspondingly opposite one another.

European Patent Document EP 0 816 125 A2 discloses a process which is known for connecting two wheel parts, such as a wheel spider and a wheel rim, by way of a weld. Such a weld may, for example, be an electron beam weld. The vehicle wheel includes two connection surfaces on the wheel spider as well as on the wheel rim which are constructed as circular rings, are opposed to one another, and are jointly aligned in a perpendicular plane. Furthermore, German Patent Document DE 41 38 558 C2 discloses a wheel which also comprises two connection surfaces on the wheel spider and on the wheel rim which are constructed as circular rings and in which connection of the two wheel parts takes place by way of a friction weld.

It is an object of this invention to provide a wheel, divided in two parts so as to have a wheel spider and a rim, which can be assembled in a simple manner for welding and in which welding can be carried out without any component hindrance.

According to the invention, this object is achieved by having the two circular rings include at least one inner connection surface or at least one additional outer connection surface which is inclined at an angle with respect to a perpendicular longitudinal center plane of the wheel for connecting and centering the wheel spider and the wheel rim. Additional advantageous characteristics are also reflected in the claims.

The principal advantages achieved by the invention are that, as a result of at least one inclined connection surface of the circular ring on the wheel spider and/or on the wheel rim, during assembly, the two wheel parts are centered with respect to one another. Consequently, the two wheel parts are precisely positioned with respect to one another for welding, and an eccentricity between the wheel parts is avoided.

The invention provides optimal centering of the two wheel parts with respect to one another, particularly by way of inclined connection surfaces on the interior circular rings of the two wheel parts. Good accessibility is also ensured during welding, particularly during beam welding, such as plasma welding and arc welding. The mutually corresponding inner connection surfaces on the circular rings of the wheel spider and of the wheel rim are arranged for this purpose diagonally from the inside to the outside at an acute angle with respect to a perpendicular longitudinal center plane of the wheel. As a result, sufficient clearance to the hollow spoke of the wheel spider exists for welding.

Corresponding outer connection surfaces of the circular ring on the wheel spider and on the wheel rim may have either an identical outwardly directed inclination as inner connection surfaces or an inwardly directed inclination.

According to another embodiment, the corresponding outer connection surfaces of the circular rings are constructed parallel to the longitudinal center plane of the wheel. If a sufficient distance exists between the hollow ribs of the wheel spider and the inner connection surfaces of the circular rings, then these connection surfaces can also be constructed parallel to the perpendicular longitudinal center plane of the wheel.

In all embodiments, the respective outer and/or inner corresponding connection surfaces of the wheel parts are constructed diagonally at an angle with respect to the longitudinal center plane of the wheel.

According to another embodiment, the connection surfaces may have corresponding step-shaped shoulders which result in centering of the two wheel parts during assembly. These step-shaped shoulders may also be inclined at an angle so that good accessibility is ensured during welding.

Beam welding methods, such as arc welding, plasma welding or laser welding methods, are used. Furthermore, electron beam welding in a vacuum or in the atmosphere is also conceivable. In addition, a friction welding method can be used; this is advantageous as a result of the self-centering of the two wheel parts by at least one inner or outer diagonally extending connection surface.

Embodiments of the invention are illustrated in the drawings and will be described in detail.

DESCRIPTION OF THE PREFERRED EMBODIMENTS

Figure 1:
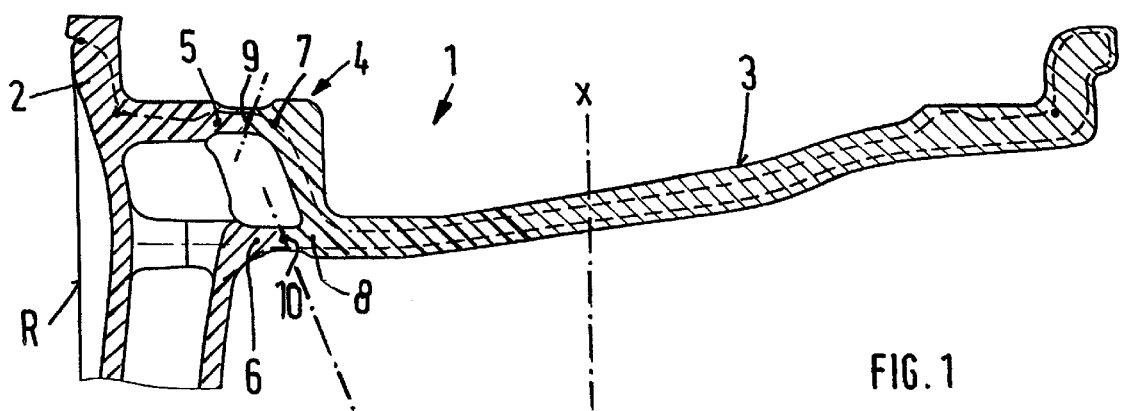
FIG. 1 is a sectional view of a partially shown wheel with two corresponding connection surfaces which are formed by circular rings and which have different inclinations.

A vehicle wheel 1 essentially includes a wheel spider 2 and a wheel rim 3 which can be produced separately from one another. The spider and the rim are connected with one another by way of a weld in the area of an inner end 4 of the wheel rim 3.

The wheel spider 2 and the wheel rim 3 have projecting circular rings 5, 6 and 7, 8 with corresponding connection surfaces 9, 10, 11, 12; 14, 15; 16, 17; and 18, 19, which are opposed to one another and are connected with one another by the weld.

FIG. 1 shows the inner connection surface 10 arranged between the circular rings 6, 8 as inclined in a plane S2 at an angle α from the inside to the outside or at an acute angle α with respect to a perpendicular longitudinal center plane x—x of the wheel. The additional outer connection surface 9 is oriented opposite the inner connection surface 10.

Figure 2:
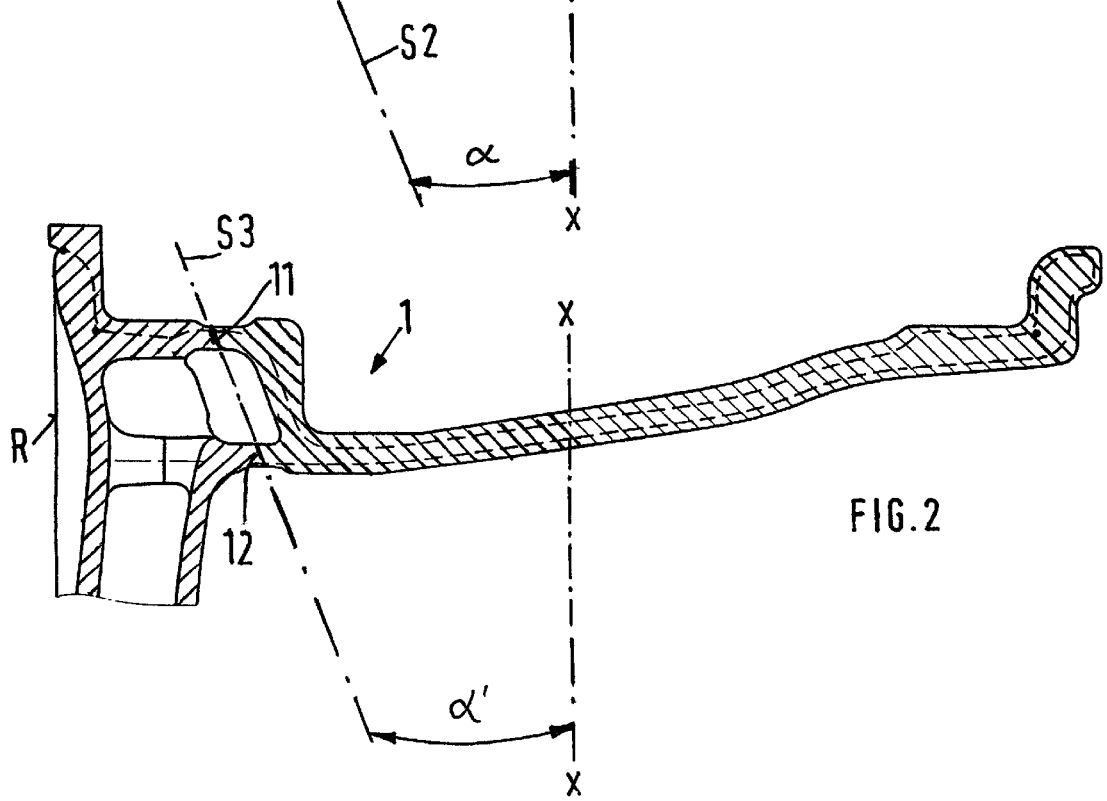
FIG. 2 is a view of another embodiment with identically inclined connection surfaces.

FIG. 2 shows an embodiment in which the outer and inner connection surfaces 11 and 12 are provided toward the exterior side R of the wheel in an identical inclined plane S3.

The inclined plane extends at an acute angle α' with respect to the perpendicular longitudinal center plane x—x of the wheel.

Figure 3:
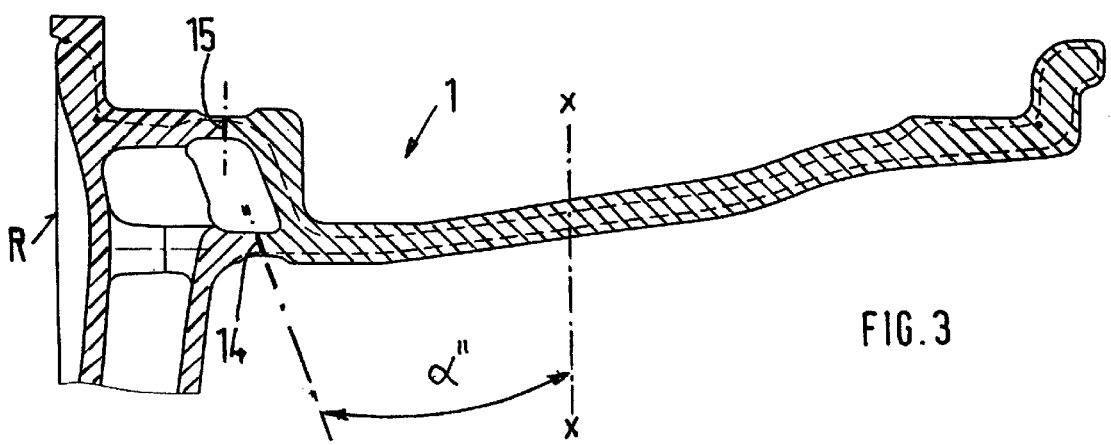
FIG. 3 is a view of another embodiment with an inner inclined connection surface and an outer perpendicularly aligned connection surface.

FIG. 3 illustrates another embodiment in which the inner connection surface 14 is inclined at an acute angle α" with respect to the perpendicular longitudinal center plane x—x of the wheel toward the exterior side R of the wheel. The outer connection surface 15 extends parallel to the perpendicular longitudinal center plane x—x of the wheel.

Figure 4:
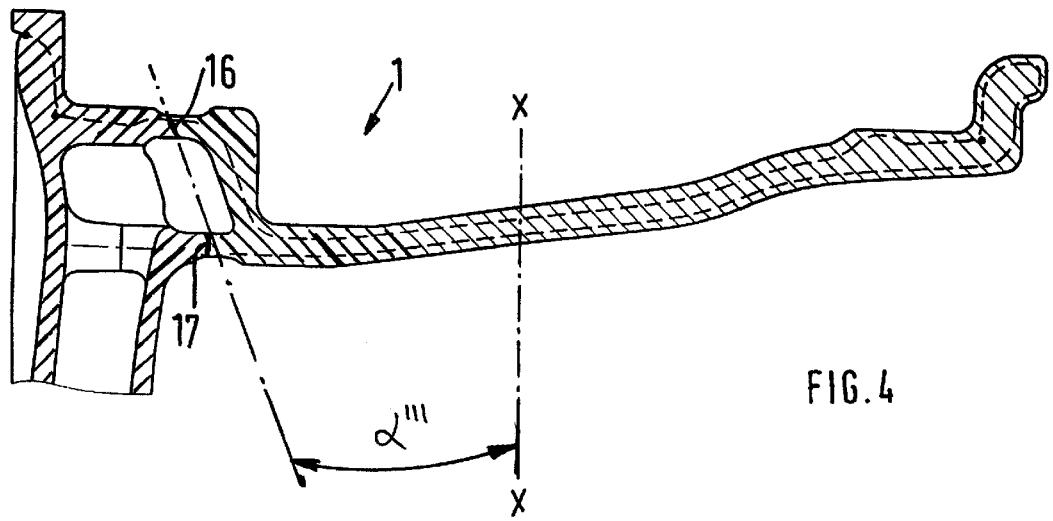
FIG. 4 is a view of another embodiment with an outer inclined connection surface and an inner perpendicularly aligned connection surface.

According to FIG. 4, the outer connection surface 16 is inclined from the interior to the exterior at an acute angle α'" with respect to the perpendicular longitudinal center plane x—x of the wheel. The inner connection surface 17 extends parallel to the perpendicular longitudinal center plane x—x of the wheel.

All connection surfaces of the wheel parts 2, 3 have a planar construction and are situated closely upon one another. Constructions of the connection surfaces in a profiled or concave or convex shape with respective corresponding connection surfaces are also conceivable.

Figure 5:
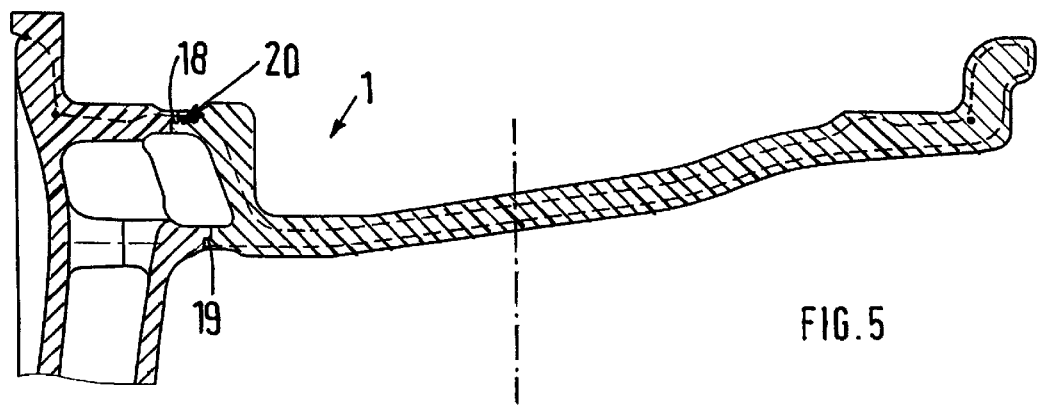
FIG. 5 is a view of another embodiment with step-shaped shoulders in the corresponding connection surfaces of the wheel parts.
Figure 6:
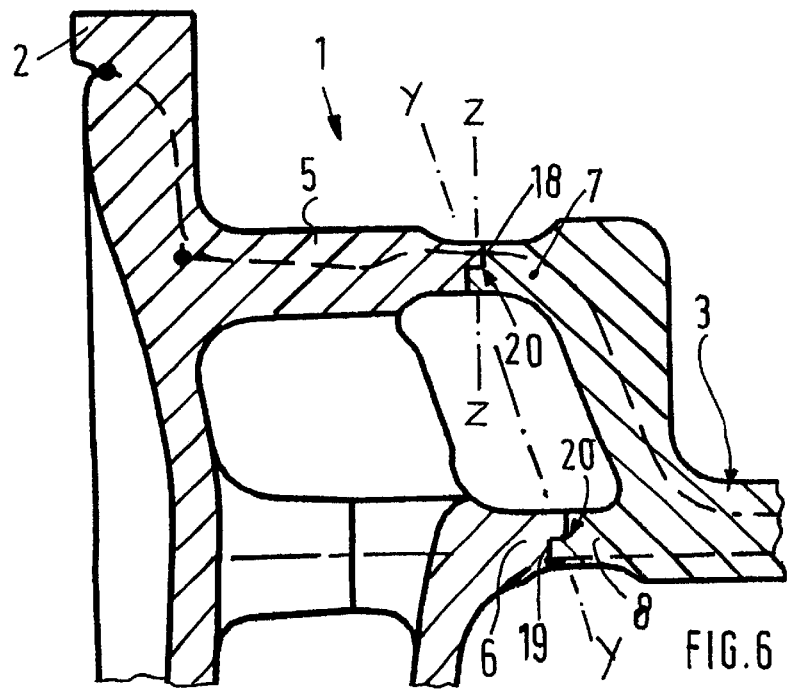
FIG. 6 is an enlarged representation of the step-shaped shoulders in the connection surfaces according to FIG. 5.

FIGS. 5 and 6 show an additional embodiment having connection surfaces 17 and 18 between the wheel parts 2 and 3. Each of the connection surfaces has a step-shaped or stair-shaped construction. More specifically, each of the connection surfaces 18, 19 has a stair-shaped shoulder which engages with the stair-shaped shoulder of the other surface in a form-locking manner. Mutual centering is therefore caused. In this embodiment, the connection surfaces 18, 19 are perpendicularly oriented in the plane z—z; however, these surfaces may also be arranged in an inclined plane y-y.

The welding of the connection surfaces can take place from the outside, from the inside, individually or jointly corresponding to the welding method used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Vehicle wheel comprising:
   a wheel spider which includes hollow spokes, and
   a wheel rim, said wheel spider, in a connection area of the wheel rim, being connected with the wheel rim by at least one weld,
   wherein the wheel spider and the wheel rim have inner and outer connection surfaces which are constructed as two circular rings and which are situated correspondingly opposite one another, and
   wherein the two circular rings include at least one inner connection surface or at least one additional outer connection surface which is inclined at an angle with respect to a perpendicular longitudinal center plane of the wheel for connecting and centering the wheel spider and the wheel rim.

2. Vehicle wheel according to claim 1, wherein each outer connection surface of the wheel parts is inclined at an angle from the outside to the inside toward an exterior side of the wheel, each inner connection surface of the wheel parts is inclined from the outside at said angle with respect to the perpendicular longitudinal center plane of the wheel, and welding planes which have opposite inclinations are obtained.

3. Vehicle wheel according to claim 1, wherein each of the outer and inner connection surfaces of the wheel spider and the wheel rim is inclined at said angle with respect to the perpendicular longitudinal center plane of the wheel from inside to outside, and wherein the connection surfaces are situated in a common welding plane.

4. Vehicle wheel according to claim 1, wherein each outer connection surface of the wheel parts is arranged parallel to the perpendicular longitudinal center plane of the wheel, and wherein each inner connection surface extends diagonally from inside to outside at said angle with respect to the perpendicular longitudinal center plane of the wheel.

5. Vehicle wheel according to claim 1, wherein each outer connection surface is inclined toward the outside at said angle with respect to the perpendicular longitudinal center plane of the wheel, and wherein each inner connection surface extends parallel to the perpendicular longitudinal center plane of the wheel.

6. Vehicle wheel according to claim 1, wherein each connection surface of the wheel spider and the wheel rim has-a flat construction.

7. Vehicle wheel according to claim 2, wherein each connection surface of the wheel spider and the wheel rim has a flat construction.

8. Vehicle wheel according to claim 3, wherein each connection surface of the wheel spider and the wheel rim has a flat construction.

9. Vehicle wheel according to claim 4, wherein each connection surface of the wheel spider and the wheel rim has a flat construction.

10. Vehicle wheel according to claim 5, wherein each connection surface of the wheel spider and the wheel rim has a flat construction.

11. Vehicle wheel comprising:
    a wheel spider which includes hollow spokes, and
    a wheel rim, said wheel spider, in a connection area of the wheel rim, being connected with the wheel rim by at least one weld,
    wherein the wheel spider and the wheel rim has at least inner and outer connection surfaces which are constructed as circular rings and which are situated opposite one another, and
    wherein each of the inner and outer connection surfaces has a step-shaped surface which corresponds with a step-shaped surface of the other of the connection surfaces.

12. Vehicle wheel according to claim 11, wherein the step-shaped surfaces are mutually corresponding step-shaped shoulders which engage with one another in a form-locking manner.

13. Vehicle wheel according to claim 11, wherein the connection surfaces of the wheel spider and the wheel rim can be connected with one another by beam welding.

14. Vehicle wheel according to claim 11, wherein the connection surfaces of the spider and the wheel rim wheel part can be connected with one another by electron beam welding.

15. Vehicle wheel according to claim 11, wherein the connection surfaces of the spider and the wheel rim wheel part can be connected with one another by a friction weld.

16. Vehicle wheel according to claim 12, wherein the connection surfaces of the wheel spider and the wheel rim can be connected with one another by beam welding.

17. Vehicle wheel according to claim 12, wherein the connection surfaces of the spider and the wheel rim wheel part can be connected with one another by electron beam welding.

18. Vehicle wheel according to claim 12, wherein the connection surfaces of the spider and the wheel rim wheel part can be connected with one another by a friction weld.

* * * * *

UNITED STATES PATENT AND TRADEMARK OFFICE
CERTIFICATE OF CORRECTION

PATENT NO.   : 6,312,059 B1
DATED        : November 6, 2001
INVENTOR(S)  : Stach It is certified that error appears in the above-identified patent and that said Letters Patent is hereby corrected as shown below:

<u>Title page,</u>
Item [75], should read -- Jens Stach, Heimsheim, Germany; Reinhold Separautzki, Moglingen, Germany --.

Signed and Sealed this

Thirtieth Day of December, 2003

JAMES E. ROGAN
*Director of the United States Patent and Trademark Office*